(12) United States Patent
Park

(10) Patent No.: US 11,654,860 B2
(45) Date of Patent: May 23, 2023

(54) PEDESTRIAN PROTECTION APPARATUS AND METHOD

(71) Applicant: HYUNDAI MOBIS CO., LTD., Seoul (KR)

(72) Inventor: Byung Hyuk Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 276 days.

(21) Appl. No.: 16/950,695

(22) Filed: Nov. 17, 2020

(65) Prior Publication Data

US 2021/0146877 A1    May 20, 2021

(30) Foreign Application Priority Data

Nov. 18, 2019 (KR) .................. 10-2019-0147466

(51) Int. Cl.
| | | |
|---|---|---|
| B60R 21/36 | (2011.01) | |
| B60R 21/0132 | (2006.01) | |
| B60R 21/0136 | (2006.01) | |
| B60R 21/38 | (2011.01) | |
| B60R 21/013 | (2006.01) | |
| B60R 21/01 | (2006.01) | |

(52) U.S. Cl.
CPC .......... B60R 21/36 (2013.01); B60R 21/0132 (2013.01); B60R 21/0136 (2013.01); B60R 21/38 (2013.01); B60R 2021/01013 (2013.01); B60R 2021/01302 (2013.01)

(58) Field of Classification Search
CPC ............... B60R 21/00; B60R 21/16; B60R 2021/23169; B60R 21/233
See application file for complete search history.

(56) References Cited

U.S. PATENT DOCUMENTS

| 7,966,127 B2 * | 6/2011 | Ono .................... B60R 21/0134 |
| | | 701/96 |
| 2007/0027584 A1 * | 2/2007 | Hau ........................ B60R 21/34 |
| | | 701/1 |
| 2015/0224956 A1 * | 8/2015 | Takenaka ................ B60R 21/38 |
| | | 73/862.381 |
| 2019/0286123 A1 * | 9/2019 | Bando .................. G05D 1/0044 |

FOREIGN PATENT DOCUMENTS

WO    WO-2008057042 A1 *    5/2008    ............ G01J 5/0022

* cited by examiner

*Primary Examiner* — Paul N Dickson
*Assistant Examiner* — Matthew Joseph Ganci
(74) *Attorney, Agent, or Firm* — NovoTechIP International PLLC

(57) ABSTRACT

Provided is a pedestrian protection apparatus. An image capturer captures a far infrared (FIR) image of an object in front of a vehicle. A sensor is mounted on a bumper of the vehicle and senses at least one of a change in acceleration and a change in pressure of the bumper caused by a collision between the vehicle and an object located in front of the vehicle. A controller determines whether or not the object is a pedestrian candidate in accordance with the FIR image captured by the image capturer, determines whether or not the pedestrian candidate is a pedestrian in accordance with at least one of the change in the acceleration and the change in the pressure sensed by the sensor, and operates a protector for pedestrian protection in response to the pedestrian candidate being identified as the pedestrian.

20 Claims, 5 Drawing Sheets

PEDESTRIAN PROTECTION APPARATUS AND METHOD

CROSS-REFERENCE TO RELATED APPLICATION

This application claims priority from and the benefit of Korean Patent Application No. 10-2019-0147466, filed on Nov. 18, 2019, which is hereby incorporated by reference for all purposes as if set forth herein.

BACKGROUND

Field

Exemplary embodiments of the present disclosure relate to a pedestrian protection apparatus and method, and more particularly, to a pedestrian protection apparatus and method that activates a protector for protecting a pedestrian by sensing a collision of the pedestrian on the basis of a far infrared (FIR) image of a region in front of a vehicle and bumper sensing information.

Discussion of the Background

In an accident occurring between a vehicle and a pedestrian, the pedestrian may first collide with a front bumper of the vehicle and then fall down toward a hood panel of the vehicle so that the head of the pedestrian collide with a hood as a secondary collision. Consequently, the impact energy of the collision may be directly transmitted to the pedestrian, thereby causing a deadly injury to the pedestrian.

Accordingly, with the strengthening of pedestrian protection laws and regulations, active hood systems have been recently applied. Such an active hood system may deploy a pedestrian protection airbag, mounted on an outer portion of a vehicle, so as to protect the head of a pedestrian from a fatal injury when the pedestrian collides with the vehicle, or may move the hood of the vehicle upward so as to secure a space able to absorb impact energy of the pedestrian between the hood and the engine room of the vehicle.

A pedestrian #detection device used in the pedestrian protection airbag or the active hood system of the related art may accurately identify standard structures designated by the European New Car Assessment Programme (Euro NCAP). However, the pedestrian detection device has a low accuracy level when identifying objects, except for the standard structures, for example, animals, such as a roe deer, and atypical structures, such as a median separator, the strength or weight of which is similar to that of the pedestrian.

SUMMARY

The present disclosure has been made in consideration of the above-described problems, and is intended to provide a pedestrian protection apparatus and method that activates a protector for protecting a pedestrian by sensing a collision of the pedestrian on the basis of a far infrared (FIR) image of a region in front of a vehicle and bumper sensing information.

In an aspect of the present disclosure, a pedestrian protection apparatus may include: an image capturer configured to capture a far infrared (FIR) image of an object in front of a vehicle; a sensor mounted on a bumper of the vehicle and configured to sense at least one of a change in acceleration and a change in pressure of the bumper caused by a collision between the vehicle and an object located in front of the vehicle; and a controller configured to determine whether or not the object is a pedestrian candidate in accordance with the FIR image captured by the image capturer, determine whether or not the pedestrian candidate is a pedestrian in accordance with at least one of the change in the acceleration and the change in the pressure sensed by the sensor, and operate a protector for pedestrian protection in response to the pedestrian candidate being identified as the pedestrian.

The protector may include at least one of a hood lift actuator and a pedestrian protection external airbag.

The controller may extract an area, having a brightness level equal to or higher than a predetermined reference brightness level, from the FIR image and determine whether or not the object is the pedestrian candidate in accordance with the extracted area.

The controller may determine whether or not the pedestrian candidate is the pedestrian by determining whether or not the change in the pressure exceeds a predetermined pressure change reference value.

The controller may predict a compression displacement of the bumper of the vehicle due to the collision in accordance with the change in the acceleration and determine whether or not the pedestrian candidate is the pedestrian in accordance with the bumper compression displacement.

The controller may determine whether or not the pedestrian candidate is the pedestrian by determining whether or not the bumper compression displacement exceeds a predetermined first compression displacement reference value.

The controller may calculate a vibration displacement of the bumper of the vehicle in accordance with the change in the acceleration and determine whether or not the pedestrian candidate is the pedestrian in accordance with the bumper vibration displacement.

The controller may determine whether or not the pedestrian candidate is the pedestrian by determining whether or not the bumper vibration displacement is less than a predetermined first vibration displacement reference value.

The pedestrian protection apparatus may further include a relative speed meter configured to measure a relative speed of the pedestrian candidate with respect to the vehicle. The controller may control an operation of the protector in accordance with the relative speed of the pedestrian candidate with respect to the vehicle.

When the relative speed of the pedestrian candidate with respect to the vehicle exceeds a predetermined reference speed, the controller may not operate the protector even when the pedestrian candidate is the pedestrian.

In an aspect of the present disclosure, a pedestrian protection method may include: capturing, by an image capturer, a far infrared (FIR) image of an object in front of a vehicle; sensing, by a sensor, at least one of a change in acceleration and a change in pressure of a bumper caused by a collision between the vehicle and an object located in front of the vehicle; determining, by a controller, whether or not the object is a pedestrian candidate in accordance with the FIR image captured by the image capturer, and determining whether or not the pedestrian candidate is a pedestrian in accordance with the change in the acceleration and the change in the pressure sensed by the sensor; and operating, by the controller, a protector for pedestrian protection in response to the pedestrian candidate being identified as the pedestrian.

The protector may include at least one of a hood lift actuator and a pedestrian protection external airbag.

In the determining, the controller may extract an area, having a brightness level equal to or higher than a predetermined reference brightness level, from the FIR image captured by the image capturer and determine whether or not the object is the pedestrian candidate in accordance with the extracted area.

In the determining, the controller may determine whether or not the pedestrian candidate is the pedestrian by determining whether or not the change in the pressure exceeds a predetermined pressure change reference value.

In the determining, the controller may predict a compression displacement of the bumper of the vehicle due to the collision in accordance with the change in the acceleration and determine whether or not the pedestrian candidate is the pedestrian in accordance with the bumper compression displacement.

In the determining, the controller may determine whether or not the pedestrian candidate is the pedestrian by determining whether or not the bumper compression displacement exceeds a predetermined first compression displacement reference value.

In the determining, the controller may calculate a vibration displacement of the bumper of the vehicle due to the collision in accordance with the change in the acceleration and determine whether or not the pedestrian candidate is the pedestrian in accordance with the bumper vibration displacement.

In the determining, the controller may determine whether or not the pedestrian candidate is the pedestrian by determining whether or not the bumper vibration displacement is less than a predetermined first vibration displacement reference value.

The pedestrian protection method may further include measuring, by a relative speed meter, a relative speed of the pedestrian candidate with respect to the vehicle, wherein an operation of the protector is controlled in accordance with the relative speed of the pedestrian candidate with respect to the vehicle.

In the operating, when the relative speed of the pedestrian candidate with respect to the vehicle exceeds a predetermined reference speed, the controller may not operate the protector even when the pedestrian candidate is the pedestrian.

According to an aspect of the present disclosure, the present disclosure may sense a collision with a pedestrian on the basis of an FIR image of a region in front of the vehicle and bumper sensing information, thereby improving collision sensing performance and the reliability of the operation of the protector for protecting the pedestrian from an injury.

DETAILED DESCRIPTION OF THE ILLUSTRATED EMBODIMENTS

Figure 1:
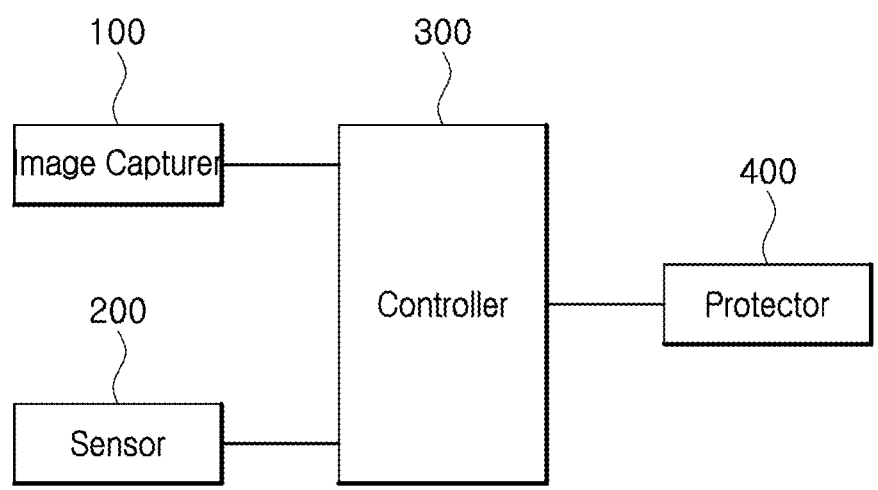
FIG. 1 is a block configuration diagram illustrating a pedestrian protection apparatus according to an embodiment of the present disclosure.

Hereinafter, a pedestrian protection apparatus and method according to an embodiment of the present disclosure will be described in detail with reference to the accompanying drawings. In the following description, the thicknesses of lines or the sizes of components illustrated in the drawings may be exaggerated for clarity and convenience of explanation. In addition, terms used herein are defined in consideration of functions thereof in the present disclosure, but may vary depending on the intentions of users or operators, or practices. Therefore, the terms shall be defined on the basis of the description throughout the specification.

Figure 2:
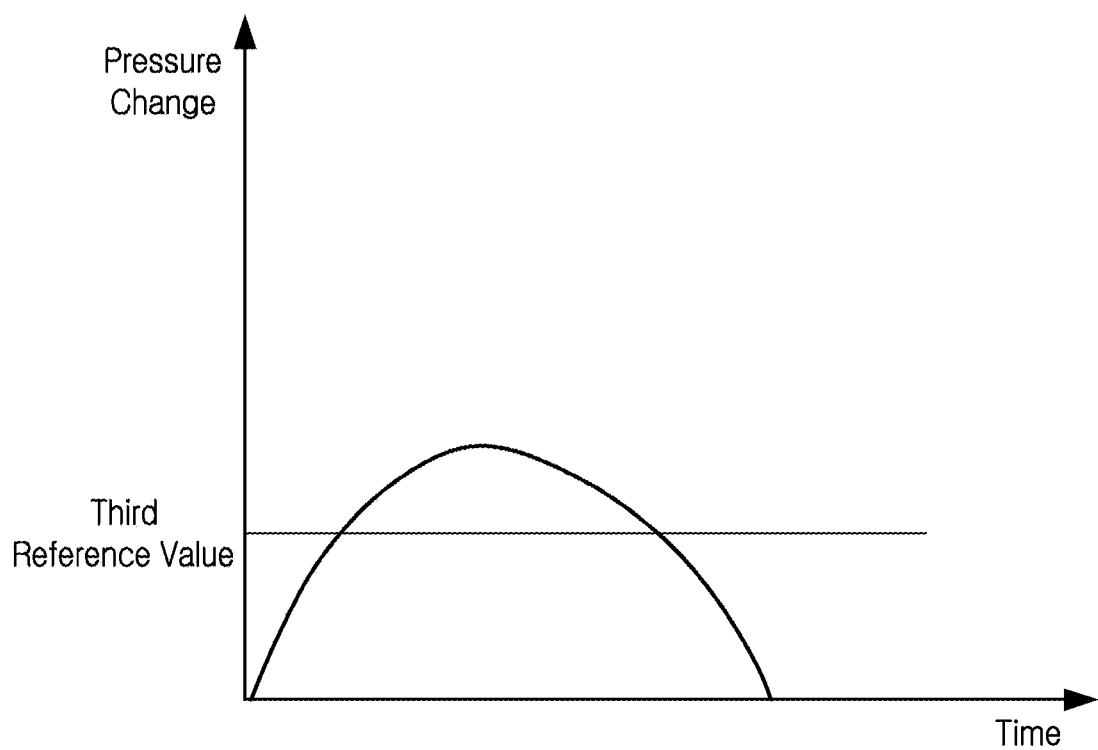
FIG. 2 is a first exemplary diagram illustrating the pedestrian protection apparatus according to an embodiment of the present disclosure.
Figure 3:
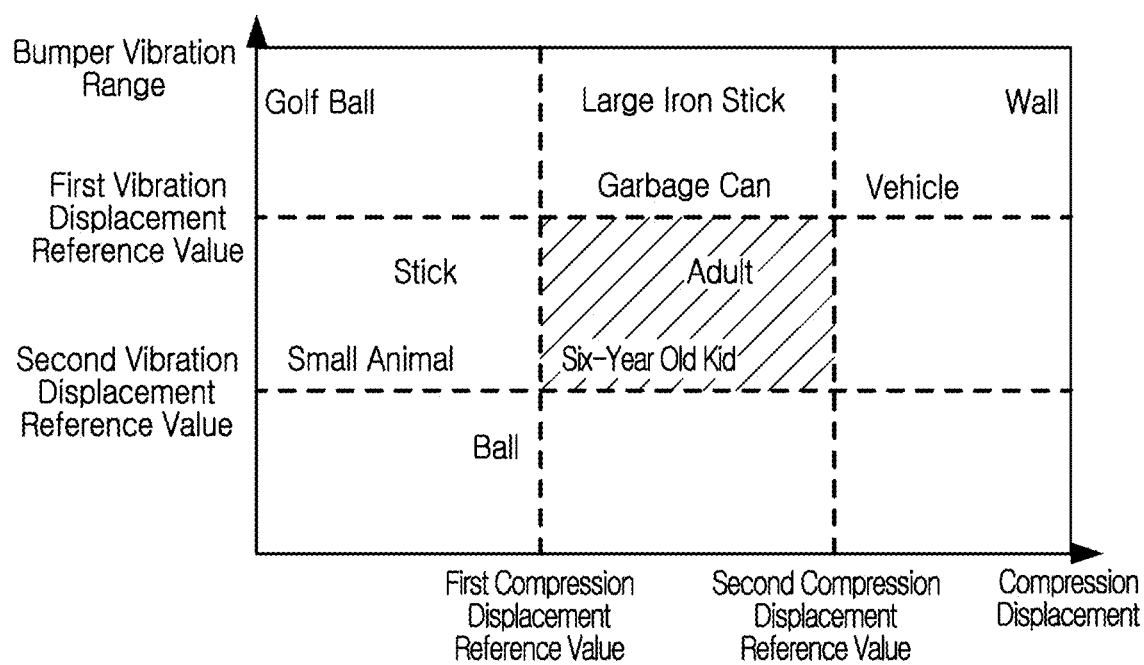
FIG. 3 is a second exemplary diagram illustrating the pedestrian protection apparatus according to an embodiment of the present disclosure.

FIG. 1 is a block configuration diagram illustrating a pedestrian protection apparatus according to an embodiment of the present disclosure, FIG. 2 is a first exemplary diagram illustrating the pedestrian protection apparatus according to an embodiment of the present disclosure, and FIG. 3 is a second exemplary diagram illustrating the pedestrian protection apparatus according to an embodiment of the present disclosure.

Referring to FIG. 1, the pedestrian protection apparatus according to an embodiment of the present disclosure may include an image capturer 100, a sensor 200, a controller 300, a protector 400.

The image capturer 100 may capture a far infrared (FIR) image of an object in front of a vehicle.

For example, the image capturer 100 may be provided on a rear end of the room mirror inside the vehicle and capture a front FIR image of the vehicle. The image capturer 100 may be an FIR camera able to capture an FIR image.

The sensor 200 may be mounted on the bumper of the vehicle and sense at least one of a change in the acceleration and a change in the pressure of the bumper caused by a collision between the vehicle and an object located in front of the vehicle.

For example, the sensor 200 may include at least one of an acceleration sensor and a pressure sensor. The sensor 200 may measure at least one of the change in the acceleration and the change in the pressure of the bumper caused by a collision between the object and the vehicle using at least one of the acceleration sensor and the pressure sensor provided therein.

Here, such acceleration sensors may be provided inside the left portion and the right portion of the bumper of the vehicle and measure acceleration occurring in the left portion and the right portion of the bumper of the vehicle. The pressure sensor may be a tube-type pressure sensor which is provided inside the bumper of the vehicle in parallel to the bumper and measures a pressure generated by the bumper.

The controller 300 may determine whether or not the object is a pedestrian candidate on the basis of the FIR image captured by the image capturer 100, determine whether or not the pedestrian candidate is a pedestrian on the basis of at least one of the change in the acceleration and the change in the pressure sensed by the sensor 200, and operate the protector 400 for pedestrian protection in response to the pedestrian candidate being identified as the pedestrian.

The controller 300 may extract an area, having a brightness level equal to or higher than a predetermined reference brightness level, from the FIR image and determine whether or not the object is the pedestrian candidate on the basis of the extracted area.

The reference brightness level may be a minimum value of brightness level according to the FIR wavelength emitted from the human body in the FIR image, and may be a predetermined value.

In general, the human body emits stronger infrared radiation than the surroundings due to the temperature thereof being higher than those of the surroundings. Thus, the human body is displayed as a brighter area than the surroundings in the FIR image. Accordingly, the controller 300 may extract the area, having the brightness level equal to or higher than the predetermined reference brightness level, from the FIR image and determine the object located in the corresponding area to be the pedestrian candidate.

The protector 400 may include at least one of a hood lift actuator and a pedestrian protection external airbag.

The hood lift actuator is a device for lifting a hood in the event of a collision between the pedestrian and the vehicle so as to reduce impact when the pedestrian collides with the hood, thereby reducing an injury caused by a secondary collision between the pedestrian and the vehicle.

The pedestrian protection external airbag is a device for reducing the injury caused by the secondary collision between the pedestrian and the vehicle using an airbag deployed outside of a vehicle body during the collision between the pedestrian and the vehicle.

The controller 300 may determine whether or not the corresponding pedestrian candidate is the pedestrian by determining whether or not the change in the pressure of the bumper caused by the collision exceeds a predetermined pressure change reference value.

Referring to FIG. 2, when the change in the pressure of the bumper caused by the collision exceeds the predetermined pressure change reference value, the controller 300 may determine that the corresponding pedestrian candidate is the pedestrian.

The pressure change reference value may be a minimum change in pressure occurring when the object that has collided with the vehicle is the pedestrian, and may be a predetermined value. Thus, when the change in the pressure of the bumper caused by the collision between the vehicle and the pedestrian candidate is equal to or smaller than the pressure change reference value, the controller 300 may determine the corresponding pedestrian candidate not to be the pedestrian.

The controller 300 may predict a compression displacement of the bumper (hereinafter, referred to as a "bumper compression displacement") of the vehicle on the basis of the change in the acceleration of the bumper due to the collision and determine whether or not the corresponding pedestrian candidate is the pedestrian on the basis of the bumper compression displacement.

The bumper compression displacement corresponds to the difference between a displacement of the bumper when the bumper is compressed to the maximum extent due to the collision between the pedestrian candidate and the vehicle and a displacement of the bumper when no collision has occurred.

The controller 300 may determine whether or not the corresponding pedestrian candidate is the pedestrian by determining whether or not the bumper compression displacement exceeds a predetermined first compression displacement reference value.

The first compression displacement reference value may be a minimum value of the bumper compression displacement that may occur when the object that has collided with the vehicle is the pedestrian, and may be a predetermined value.

For example, the controller 300 may calculate bumper compression displacements of the left and right portions of the bumper of the vehicle, respectively, on the basis of changes in the acceleration measured using the acceleration sensors provided on the left and right portions of the bumper of the vehicle, respectively, and when at least one of the calculated bumper compression displacements exceeds the predetermined first compression displacement reference value, determine the corresponding pedestrian candidate to be the pedestrian.

The bumper compression displacements may be calculated by performing double integral to the changes in the acceleration of the bumper over time. The bumper compression displacement is a value related to the weight of the object. The bumper compression displacement increases with an increase in the weight of the object or an increase in the speed of the vehicle. Since the speed of the vehicle may be measured using a speed sensor (not shown) or a relative speed meter (not shown) provided on the vehicle, the weight of the object that has collided with the vehicle may be predicted on the basis of the bumper compression displacement.

Accordingly, a table regarding the bumper compression displacement according to the weight and the relative speed of the object that has collided with the vehicle may be composed by a preliminary experiment. The minimum value of the bumper compression displacement corresponding to the relative speed of the object with respect to the vehicle in the collision may be calculated by referring to the table and may be used as the first compression displacement reference value.

Referring to Table 3, when the bumper compression displacement due to the collision between the vehicle and the pedestrian candidate is equal to or smaller than the first compression displacement reference value, the weight of the corresponding pedestrian candidate does not correspond to a weight that a typical pedestrian may physically have. Thus, the controller 300 may determine the corresponding pedestrian candidate not to be the pedestrian.

In contrast, when the bumper compression displacement due to the collision between the vehicle and the pedestrian candidate exceeds the first compression displacement reference value, the weight of the corresponding pedestrian candidate corresponds to the weight of the pedestrian. Thus, the controller 300 may determine the corresponding pedestrian candidate to be the pedestrian.

According to another embodiment of the present disclosure, the controller 300 may determine whether or not the pedestrian candidate is the pedestrian by determining whether or not the bumper compression displacement is less than a predetermined second compression displacement reference value. The second compression displacement reference value may be a maximum value of the bumper compression displacement occurring when the object that has collided with the vehicle is the pedestrian, and may be a predetermined value.

According to a still another embodiment of the present disclosure, when the bumper compression displacement exceeds the predetermined first compression displacement reference value and is less than the predetermined second compression displacement reference value, the controller 300 may determine the pedestrian candidate to be the pedestrian.

The controller 300 may calculate a vibration displacement of the bumper (hereinafter, referred to as a "bumper vibration displacement") of the vehicle due to the collision on the basis of the changes in the acceleration and determine whether or not the corresponding pedestrian candidate is the pedestrian on the basis of the bumper vibration displacement.

The controller 300 may determine whether or not the corresponding pedestrian candidate is the pedestrian by determining whether or not the bumper vibration displacement is less than a predetermined first vibration displacement reference value.

The first vibration displacement reference value may be a maximum value of the bumper vibration displacement occurring when the object that has collided with the vehicle is the pedestrian, and may be in a predetermined range.

The bumper vibration displacement due to the collision may be calculated by performing first-order integral to the change in the acceleration of the bumper over time. The bumper vibration displacement is a value regarding the stiffness of the object and increases with an increase in the stiffness of the object. Thus, the stiffness of the object may be predicted on the basis of the bumper vibration displacement.

Accordingly, a table regarding maximum bumper vibration displacements according to the stiffness of the object that has collided with the vehicle may be composed by a preliminary experiment, and a maximum bumper vibration displacement that may occur when the object that has collided with the vehicle is the pedestrian may be set to be the first vibration displacement reference value by referring to the table.

According to another embodiment of the present disclosure, when the bumper vibration displacement exceeds a predetermined second vibration displacement reference value, the controller 300 may determine the corresponding pedestrian candidate to be the pedestrian.

The second vibration displacement reference value may be a minimum value of the bumper vibration displacement occurring when the object that has collided with the vehicle is the pedestrian, and may be in a predetermined range.

According to a still another embodiment of the present disclosure, the controller 300 may determine the pedestrian candidate to be the pedestrian when the bumper vibration displacement is less than the first vibration displacement reference value and exceeds the second vibration displacement reference value.

Referring to FIG. 3, when the bumper vibration displacement due to the collision between the vehicle and the pedestrian candidate is less than the first vibration displacement reference value, the stiffness of the corresponding pedestrian candidate may correspond to that of the pedestrian. Thus, the controller 300 may determine the corresponding pedestrian candidate to be the pedestrian.

In contrast, when the bumper vibration displacement due to the collision between the vehicle and the pedestrian candidate is equal to or greater than the first vibration displacement reference value, the stiffness of the corresponding pedestrian candidate is too high to correspond to that of the pedestrian. Thus, the controller 300 may determine the corresponding pedestrian candidate not to be the pedestrian.

The pedestrian protection apparatus according to an embodiment of the present disclosure may further include the relative speed meter (not shown) for measuring the relative speed of the pedestrian candidate with respect to the vehicle. The controller 300 may control the operation of the protector 400 on the basis of the relative speed of the pedestrian candidate with respect to the vehicle.

For example, the relative speed meter (not shown) may be a millimeter wave radar.

The millimeter wave radar may measure a distance to the pedestrian candidate located in front of the vehicle and the relative speed of the pedestrian candidate with respect to the vehicle by using the Doppler frequency shift between a transmission wave and a reception wave using the millimeter wave.

When the relative speed of the pedestrian candidate with respect to the vehicle exceeds a predetermined reference speed, the controller 300 may not operate the protector 400 even when the pedestrian candidate is the pedestrian.

The reference speed may be a maximum relative speed at which the protector 400 may be operated in time so as to protect the pedestrian, and may be a predetermined value.

For example, the relative speed of the pedestrian candidate with respect to the vehicle is high, a secondary collision of the pedestrian occurs before a time at which the operation of the protector 400 is completed even when the protector 400 is operated directly after the collision. Thus, the pedestrian may not be protected from the secondary collision, and additional damage may be generated due to the operation of the protector 400. In contrast, when the relative speed of the pedestrian candidate with respect to the vehicle is low, the pedestrian may be sufficiently protected from the secondary collision by operating the protector 40 directly after the collision.

Accordingly, the protector 400 may be operated only when the relative speed of the pedestrian candidate with respect to the vehicle is equal to or lower than the predetermined reference speed so as to prevent additional damage due to an erroneous operation of the protector 400.

Figure 4:
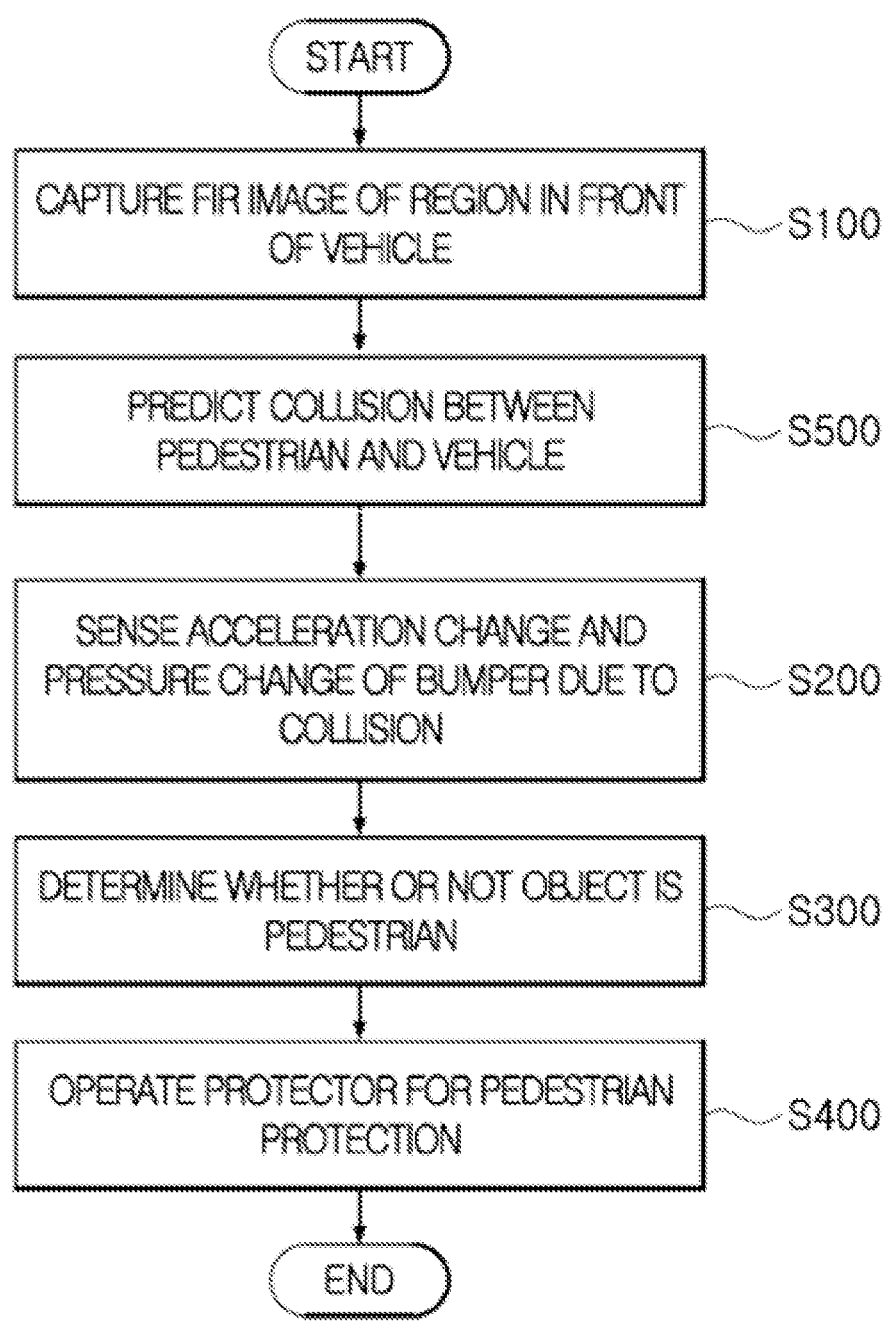
FIG. 4 is a first flowchart illustrating a pedestrian protection method according to an embodiment of the present disclosure.
Figure 5:
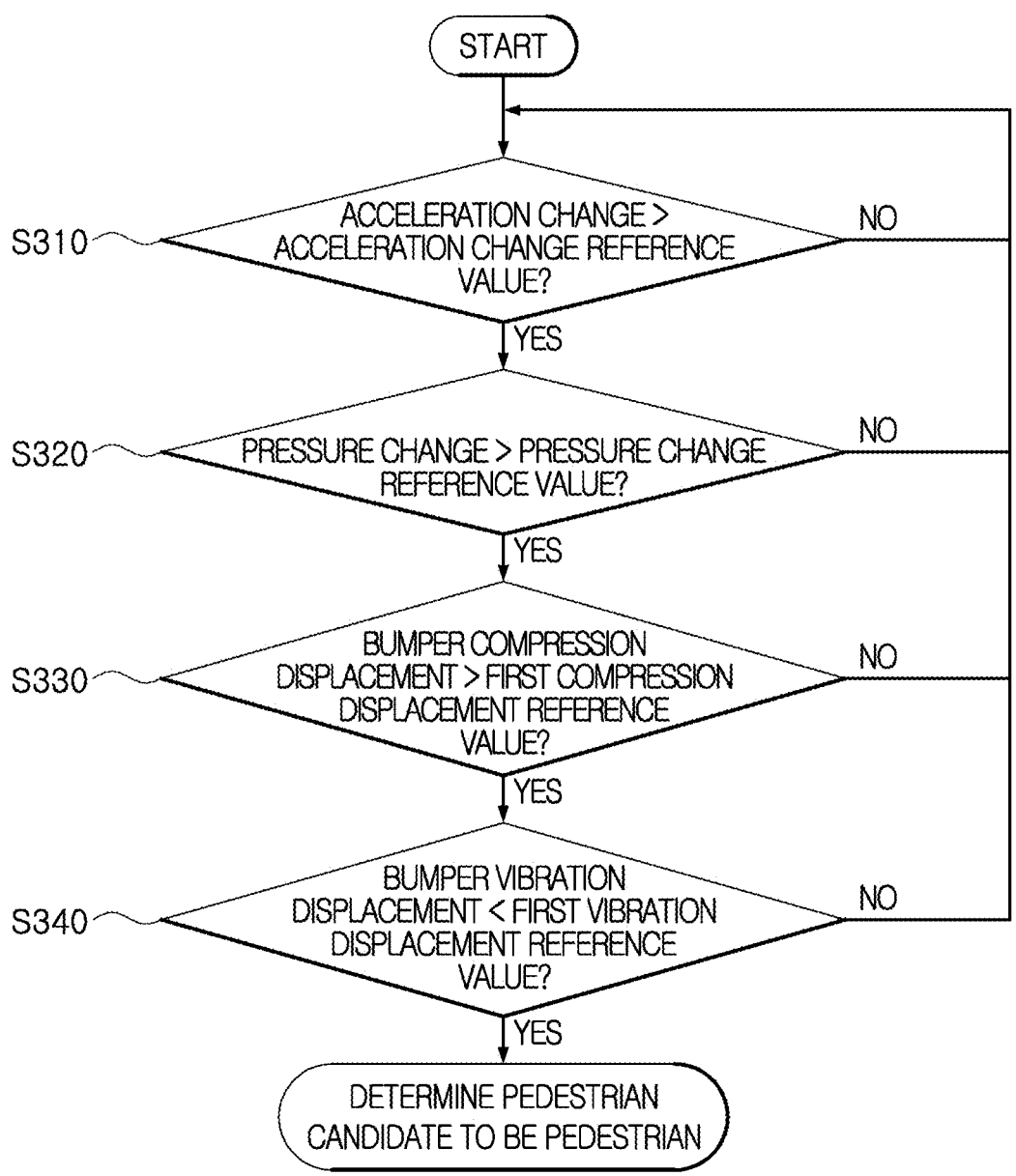
FIG. 5 is a second flowchart illustrating the pedestrian protection method according to an embodiment of the present disclosure.

FIG. 4 is a first flowchart illustrating a pedestrian protection method according to an embodiment of the present disclosure, and FIG. 5 is a second flowchart illustrating the pedestrian protection method according to an embodiment of the present disclosure.

Referring to FIG. 4, the pedestrian protection method according to an embodiment of the present disclosure may include an image-capturing step S100, a sensing step S200, a determination step S300, and an operation step S400.

In the image-capturing step S100, the image capturer 100 may capture an FIR image of a region in front of the vehicle.

The pedestrian protection method according to an embodiment of the present disclosure may further include step S500 of measuring, by the relative speed meter, the relative speed of the pedestrian candidate with respect to the vehicle.

For example, in the image-capturing step S100, the controller 300 may extract an area, having a brightness level equal to or higher than a predetermined reference brightness level, from the FIR image captured by the image capturer 100 and determine the extracted area to be a pedestrian candidate.

Subsequently, in the measuring step S500, the controller 300 may predict a collision between the pedestrian and the vehicle by measuring the relative speed of the pedestrian candidate with respect to the vehicle by the relative speed meter.

In the sensing step S200, the sensor 200 may sense a change in the acceleration and a change in the pressure of the bumper of the vehicle due to a collision between the vehicle and an object located in front of the vehicle.

In the determination step S300, the controller 300 may determine whether or not the pedestrian candidate is the pedestrian on the basis of the change in the acceleration and the change in the pressure of the bumper sensed by the sensor 200.

Referring to FIG. 5, in the determination step S300, when the change in the acceleration is measured by the sensor 200, the controller 300 may determine whether or not the measured change in the acceleration exceeds a predetermined acceleration change reference value (e.g. 0.5 g). When the measured change in the acceleration exceeds the predetermined acceleration change reference value, the controller 300 may determine that there is a collision between the vehicle and the pedestrian candidate in S310.

Afterwards, in S320, the controller 300 may determine whether or not the corresponding pedestrian candidate is the pedestrian by determining whether or not the change in the pressure measured by the sensor 200 exceeds a predetermined pressure change reference value.

For example, when the change in the pressure measured by the sensor 200 exceeds the predetermined pressure change reference value (e.g. 15 mbar), the controller 300 may determine the corresponding pedestrian candidate that has collided with the vehicle to be the pedestrian.

The controller 300 may predict a bumper compression displacement of the vehicle due to the collision on the basis of the change in the acceleration and determine whether or not the pedestrian candidate is the pedestrian on the basis of the bumper compression displacement, in S330.

According to an embodiment of the present disclosure, the controller 300 may determine whether or not the corresponding pedestrian candidate is the pedestrian by determining whether or not the bumper compression displacement exceeds the predetermined first compression displacement reference value.

For example, when the bumper compression displacement exceeds the predetermined first compression displacement reference value, the controller 300 may determine the corresponding pedestrian candidate to be the pedestrian.

Subsequently, the controller 300 may calculate a bumper vibration displacement of the vehicle due to the collision on the basis of the change in the acceleration and determine whether or not the corresponding pedestrian candidate is the pedestrian on the basis of the bumper vibration displacement, in S340.

According to an embodiment of the present disclosure, the controller 300 may determine whether or not the corresponding pedestrian candidate is the pedestrian by determining whether or not the bumper vibration displacement is less than the predetermined first vibration displacement reference value.

For example, when the bumper vibration displacement is less than the predetermined first vibration displacement reference value, the controller 300 may determine the corresponding pedestrian candidate to be the pedestrian.

According to an embodiment of the present disclosure, when all of the above-described conditions for determining the pedestrian are satisfied, the controller 300 may finally determine the corresponding pedestrian candidate to be the pedestrian.

For example, when the change in the pressure measured by the sensor 200 exceeds the predetermined pressure change reference value (e.g. 15 mbar), the bumper compression displacement exceeds the predetermined first compression displacement reference value, and the bumper vibration displacement is less than the predetermined first vibration displacement reference value, the controller 300 may finally determine the corresponding pedestrian candidate to be the pedestrian.

The determination step S300 has been described as being sequentially performed as illustrated in FIG. 5. However, according to other embodiments of the present disclosure, the respective processes of determining the pedestrian may be performed in parallel or be performed in other sequences.

In addition, in the operation step S400, the controller 300 may operate the protector 400 to protect the pedestrian in response to the corresponding pedestrian candidate being identified to be the pedestrian.

For example, when the corresponding pedestrian candidate is finally determined to be the pedestrian, the controller 300 may operate at least one of the hood lift actuator and the pedestrian protection external airbag.

In addition, in the operation step S400, the controller 300 may control the operation of the protector 400 on the basis of the relative speed of the pedestrian candidate with respect to the vehicle.

For example, when the relative speed of the pedestrian candidate with respect to the vehicle exceeds a predetermined reference speed, the controller 300 may not operate the protector 400 even in the case that the pedestrian candidate is the pedestrian.

As set forth above, the pedestrian protection apparatus and method according to the embodiments of the present disclosure may sense a collision with a pedestrian on the basis of an FIR image of a region in front of the vehicle and bumper sensing information, thereby improving collision sensing performance and the reliability of the operation of the protector for protecting the pedestrian from an injury.

The implementations described herein may be implemented in, for example, a method or a process, an apparatus, a software program, a data stream, or a signal. Even if only discussed in the context of a single form of implementation (for example, discussed only as a method), features discussed may also be implemented in other forms (for example a program). An apparatus may be implemented in, for example, appropriate hardware, software, and firmware. The methods may be implemented in, for example, an apparatus, such as a processor, which generally refers to a processing device in general, including, for example, a computer, a microprocessor, an integrated circuit, or a programmable logic device. In addition, the processor includes communication devices, which facilitate communication of information between end-users, such as a computer, a cellular phone, a portable/personal digital assistant ("PDA"), and other devices.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A pedestrian protection apparatus comprising:
   an image capturing device configured to capture a far infrared (FIR) image of an object in front of a vehicle;
   a sensor disposed at a bumper of the vehicle and configured to sense a change to an acceleration of the vehicle and a change to a pressure of the bumper caused by a collision between the vehicle and the object located in front of the vehicle;
   a protection device configured to protect a pedestrian colliding with the vehicle; and
   a controller configured to:
   determine, based on the captured FIR image of the object, whether or not the object is a pedestrian candidate;
   after determining that the object is the pedestrian candidate, determine, based on the sensed change to at least one of the acceleration of the vehicle and the sensed change to the pressure of the bumper, whether or not the pedestrian candidate is a pedestrian; and after determining that the pedestrian candidate is the pedestrian, control the protection device to protect the pedestrian.

2. The pedestrian protection apparatus of claim 1, wherein the protection device comprises at least one of a hood lift actuator and a pedestrian protection external airbag.

3. The pedestrian protection apparatus of claim 1, wherein the controller extracts an area, having a brightness level equal to or higher than a predetermined reference brightness level, from the FIR image and determines whether or not the object is the pedestrian candidate in accordance with the extracted area.

4. The pedestrian protection apparatus of claim 1, wherein the controller determines whether or not the pedestrian candidate is the pedestrian by determining whether or not the change in the pressure exceeds a predetermined pressure change reference value.

5. The pedestrian protection apparatus of claim 1, wherein the controller predicts a compression displacement of the bumper of the vehicle due to the collision in accordance with the change in the acceleration and determines whether or not the pedestrian candidate is the pedestrian in accordance with the bumper compression displacement.

6. The pedestrian protection apparatus of claim 5, wherein the controller determines whether or not the pedestrian candidate is the pedestrian by determining whether or not the bumper compression displacement exceeds a predetermined first compression displacement reference value.

7. The pedestrian protection apparatus of claim 1, wherein the controller calculates a vibration displacement of the bumper of the vehicle in accordance with the change in the acceleration and determines whether or not the pedestrian candidate is the pedestrian in accordance with the bumper vibration displacement.

8. The pedestrian protection apparatus of claim 7, wherein the controller determines whether or not the pedestrian candidate is the pedestrian by determining whether or not the bumper vibration displacement is less than a predetermined first vibration displacement reference value.

9. The pedestrian protection apparatus of claim 1, further comprising a relative speed meter configured to measure a relative speed of the pedestrian candidate with respect to the vehicle, wherein the controller controls an operation of the protection device in accordance with the relative speed of the pedestrian candidate with respect to the vehicle.

10. The pedestrian protection apparatus of claim 9, wherein, when the relative speed of the pedestrian candidate with respect to the vehicle exceeds a predetermined reference speed, the controller does not operate the protection device even when the pedestrian candidate is the pedestrian.

11. A method of detecting and protecting a pedestrian colliding with a vehicle, comprising:

capturing, using an image capturing device, a far infrared (FIR) image of an object in front of the vehicle;

sensing, using a sensor, a change to an acceleration of the vehicle and a change to a pressure of a bumper caused by a collision between the vehicle and the object located in front of the vehicle;

determining, based on the captured FIR image of the object, whether the object is a pedestrian candidate;

after determining that the object is the pedestrian candidate, determining, based on the change to the acceleration of the vehicle and the sensed change to the pressure of the bumper, whether the pedestrian candidate is a pedestrian; and after determining that the pedestrian candidate is the pedestrian, controlling a protection device to protect the pedestrian.

12. The pedestrian protection method of claim 11, wherein the protection device comprises at least one of a hood lift actuator and a pedestrian protection external airbag.

13. The pedestrian protection method of claim 11, wherein, in the determining, the controller extracts an area, having a brightness level equal to or higher than a predetermined reference brightness level, from the FIR image captured by the image capturing device and determines whether or not the object is the pedestrian candidate in accordance with the extracted area.

14. The pedestrian protection method of claim 11, wherein, in the determining, the controller determines whether or not the pedestrian candidate is the pedestrian by determining whether or not the change in the pressure exceeds a predetermined pressure change reference value.

15. The pedestrian protection method of claim 11, wherein, in the determining, the controller predicts a compression displacement of the bumper of the vehicle due to the collision in accordance with the change in the acceleration and determines whether or not the pedestrian candidate is the pedestrian in accordance with the bumper compression displacement.

16. The pedestrian protection method of claim 15, wherein, in the determining, the controller determines whether or not the pedestrian candidate is the pedestrian by determining whether or not the bumper compression displacement exceeds a predetermined first compression displacement reference value.

17. The pedestrian protection method of claim 11, wherein, in the determining, the controller calculates a vibration displacement of the bumper of the vehicle due to the collision in accordance with the change in the acceleration and determines whether or not the pedestrian candidate is the pedestrian in accordance with the bumper vibration displacement.

18. The pedestrian protection method of claim 17, wherein, in the determining, the controller determines whether or not the pedestrian candidate is the pedestrian by determining whether or not the bumper vibration displacement is less than a predetermined first vibration displacement reference value.

19. The pedestrian protection method of claim 11, further comprising measuring, by a relative speed meter, a relative speed of the pedestrian candidate with respect to the vehicle, wherein an operation of the protection device is controlled in accordance with the relative speed of the pedestrian candidate with respect to the vehicle.

20. The pedestrian protection method of claim 19, wherein, in the operating, when the relative speed of the pedestrian candidate with respect to the vehicle exceeds a predetermined reference speed, the controller does not operate the protection device even when the pedestrian candidate is the pedestrian.

* * * * *